(12) United States Patent
Dean et al.

(10) Patent No.: US 6,454,492 B1
(45) Date of Patent: Sep. 24, 2002

(54) SUBSEA PIG LAUNCHING AND RECEIVING SYSTEM AND METHOD OF USE AND INSTALLATION

(75) Inventors: James L. Dean, Spring; Richard Weser; Karl Winter, both of Houston, all of TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 09/583,418

(22) Filed: May 31, 2000

(51) Int. Cl.[7] .................................................. B08B 9/04
(52) U.S. Cl. .................... 405/158; 405/184.1; 15/104.5; 15/104.61; 15/104.62
(58) Field of Search .............................. 405/211, 211.1, 405/154.1, 158, 184.1; 15/104.5, 104.61, 104.62

(56) References Cited

U.S. PATENT DOCUMENTS

| | | | | |
|---|---|---|---|---|
| 3,961,493 A | * | 6/1976 | Nolan, Jr. et al. .......... 405/158 |
| 4,050,955 A | | 9/1977 | Southgate | |
| 5,027,466 A | * | 7/1991 | Crawford ............... 15/104.062 |
| 5,178,429 A | * | 1/1993 | Gray et al. .................... 294/93 |
| 5,186,757 A | * | 2/1993 | Abney, Sr. ............. 15/104.062 |
| 5,433,236 A | * | 7/1995 | Zollinger et al. ...... 15/104.062 |
| 5,444,886 A | * | 8/1995 | Takashina et al. ...... 15/104.062 |
| 5,769,955 A | * | 6/1998 | Kozisek .................. 15/104.062 |
| 5,842,816 A | * | 12/1998 | Cunningham .......... 15/104.062 |
| 5,884,656 A | * | 3/1999 | Smith ..................... 15/104.062 |
| 5,891,260 A | * | 4/1999 | Streets et al. ............. 15/104.05 |
| 5,913,637 A | * | 6/1999 | Rajabali et al. ................ 15/158 |
| 5,927,319 A | * | 7/1999 | Burkhalter ............. 15/104.061 |
| 6,079,074 A | * | 6/2000 | Ellett ..................... 15/104.062 |

FOREIGN PATENT DOCUMENTS

| | | | | |
|---|---|---|---|---|
| DE | 4031789 A1 | * | 11/1991 | ............. B08B/9/04 |
| WO | WO-91/17386 | * | 11/1991 | ............. F17D/3/08 |

* cited by examiner

*Primary Examiner*—Thomas B. Will
*Assistant Examiner*—Alexander K. Pechhold
(74) *Attorney, Agent, or Firm*—Duane Morris LLP

(57) ABSTRACT

A pig launching system and a pig receiving system for use in cleaning a subsea flowline. This invention further relates to a method of propelling a pig through a flowline using a pressurized accumulator, a method of assembling a subsea pig receiver in a flowline using a remotely operated vehicle, and a method of collecting a sample from a subsea flowline, using an accumulator connected to a pig launcher.

11 Claims, 3 Drawing Sheets

SUBSEA PIG LAUNCHING AND RECEIVING SYSTEM AND METHOD OF USE AND INSTALLATION

BACKGROUND OF THE INVENTION

1. Field of the Invention

This invention relates to a pig launching system and a pig receiving system for use in cleaning subsea flowline. This invention further relates to a method of propelling a pig through a flowline using a pressurized accumulator, a method of assembling a subsea pig receiver in a flowline using a remotely operated vehicle, and a method of collecting a sample from a subsea flowline, using an accumulator connected to a pig launcher.

2. Description of the Prior Art

Conventional surface launched pigging systems for subsea flow lines used in the transport of oil and/or gas, requires two flow lines from the host facility to the well. This doubles the flowline costs as compared with installing a single flowline. For distances where the flowline length exceeds thirty (30) miles, the extra cost associated with installing a second flowline can be highly detrimental to the economic feasibility of the project.

Prior art methods of propelling a pig through a subsea flowline have not used pressurized subsea accumulators. The present invention provides the ability to launch a pig into a single subsea flowline using a pressurized accumulator and to later retrieve the pig in a pig receiver, installed in the flowline.

SUMMARY OF THE INVENTION

One aspect of the present invention is directed toward a pig receiving system which comprises a flowline comprising a connector hub mounted on the flowline and a pig receiving inlet. The system further comprises a pig receiver mounted to the connector hub. The receiver comprises an outer body defining an inner volume sufficiently large to contain a pig sized to abrasively clean the flowline. The receiver is capable of receiving a pig launched from a host facility. The receiver further comprises an inlet section adjacent to the inner volume. The outer body of the receiver comprises openings large enough to allow debris to pass through them and small enough to prevent a pig from passing through them. The system of the present invention further comprises a pig retention mechanism mounted in the receiver.

Another aspect of the present invention is directed toward a method of injecting a pig into a flowline comprising placing the pig in a pig launcher housing connected to a flowline. The housing has an inlet and an outlet. The method further comprises opening a flow control device in a connecting line installed between an outlet of a pressurized accumulator and the inlet of the launcher housing for a sufficient amount of time to allow pressurized fluid to flow from the accumulator, through the connecting line, and into the launcher housing to propel the pig into the flowline.

The invention is also directed to a pig launching system in which a pig launcher is mounted to the same connector hub, to which a pig receiver may be connected. The pig launcher is capable of launching the pig into the flowline just past the well tie-in point. From the well tie-in point a valve in the flowline may be opened to allow well flow and pressure to propel the pig to the host facility.

Another aspect of the present invention is directed to a method of assembling a subsea pig receiver in a flowline, comprising attaching a pig receiver having an inlet section to a downline with a sling and lowering the receiver into the sea to a location above a connector hub on a flowline. The method further comprises grasping the receiver with a remotely operated vehicle, using the remotely operated vehicle to place the inlet section of the receiver on the connector hub, and connecting the receiver to the flowline at the interface between the inlet section and the connector hub.

The invention is further directed toward a method of collecting a sample from a subsea flowline. This method comprises a establishing a pressure in a sample collecting vessel that is lower than a pressure in a subsea pressurized flowline to which the vessel is connected. This method further comprises opening a flow control device in a connecting line installed between an outlet of the sample collecting vessel in the inlet of a pig launcher housing in fluid communication with the pressurized flowline, wherein the flowline contains process fluid. The flow control device is opened for a sufficient amount of time to allow process fluid to flow from the flowline, through the launcher, and into the vessel.

DESCRIPTION OF THE PREFERRED EMBODIMENTS

Figure 1A:
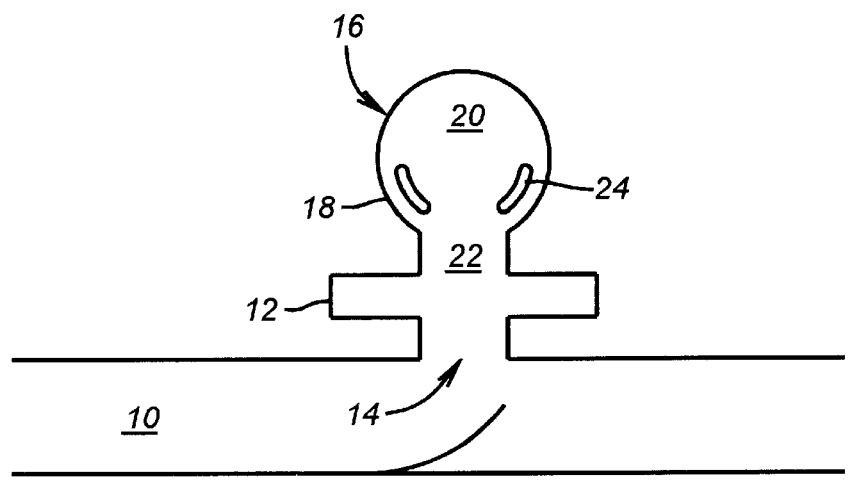
FIG. 1A is a side view of the pig receiving system of the present invention.

One aspect of the present invention is directed toward a pig receiving system which comprises a flowline 10 comprising a connector hub 12 mounted on the flowline and a pig passageway 14, as shown in FIG. 1A. In a preferred embodiment, the flowline comprises a curved section adjacent to the connector hub.

The system further comprises a pig receiver 16 mounted to the connector hub. The receiver comprises an outer body 18 defining an inner volume 20 sufficiently large to contain a pig sized to abrasively clean the flowline, as shown in FIG. 1A. The receiver further comprises an inlet section 22 adjacent to the inner volume, as shown in FIG. 1A. The outer body of the receiver comprises openings 24 large enough to allow debris to pass through them and small enough to prevent a pig from passing through them.

Figure 2:
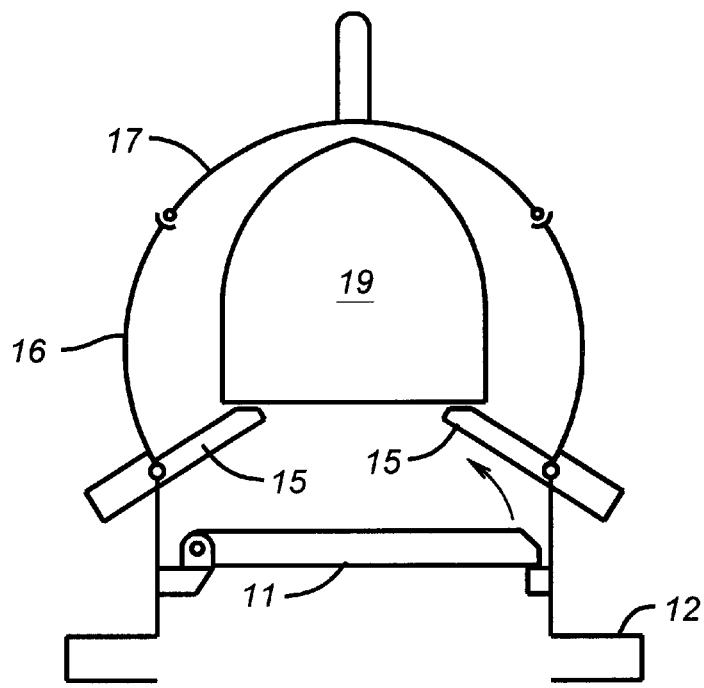
FIG. 2 is a cross sectional view of the pig receiver of the present invention.

In one preferred embodiment, the receiver is vertically mounted, as shown in FIG. 1A. In another preferred embodiment, the receiver comprises a check valve 11, mounted in the inlet, as shown in FIG. 2. In another preferred embodiment, the check valve 11, is a flapper valve. In a preferred embodiment, the receiver comprises a removable top section 17, large enough to permit the extraction of a pig from the receiver when the top section is removed, as shown in FIG. 2.

Figure 1B:
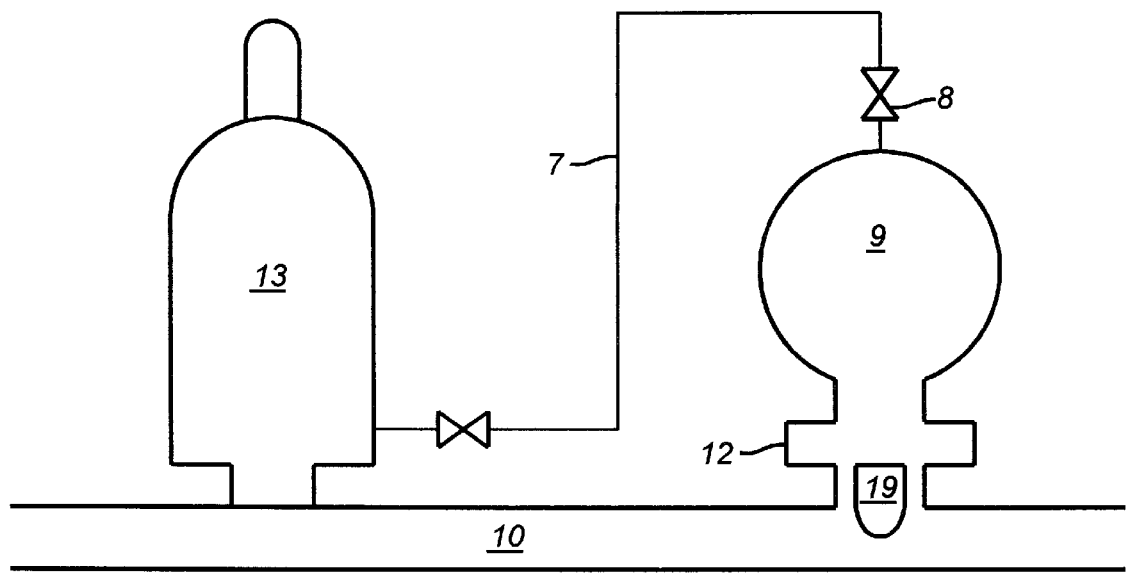
FIG. 1B is a side view of the pig launching system of the present invention.

The present invention is also directed to a pig launching system comprising a pressurized accumulator 13 in fluid communication with a pig launcher 9, as shown in FIG. 1B.

The accumulator is connected to the launcher such that it can provide sufficient pressure to propel a pig into the flowline. In a preferred embodiment, an injection line 7 connects the accumulator to the pig launcher as shown in FIG. 1B. A flow control device 8 is installed in the injection line, as shown in FIG. 1B. In a preferred embodiment the accumulator is pressurized with nitrogen and seawater.

The invention further comprises a pig retention mechanism 15 mounted in the receiver, as shown in FIG. 2. In the preferred embodiment, the pig retention mechanism comprises at least two spring loaded latches 15, mounted on opposite sides of the inlet section. The latches are configured to project radially into the inlet section after the pig travels past them such that they prevent the pig from dropping back into the flowline. In another preferred embodiment, the system comprises a pig 19, as shown in FIG. 1.

Figure 3:
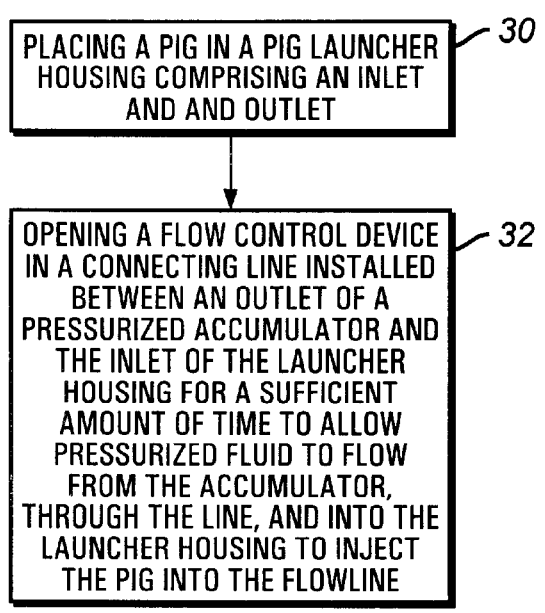
FIG. 3 is a block diagram of a method of injecting a pig into a flowline of the present invention.

Another aspect of the present invention is directed toward a method of injecting a pig into a flowline comprising placing the pig in a pig launcher housing connected to a flowline, as shown in block 30 of FIG. 3. The housing has an inlet and an outlet. The method further comprises opening a flow control device in a connecting line installed between an outlet of a pressurized accumulator and the inlet of the launcher housing for a sufficient amount of time to allow pressurized fluid to flow from the accumulator, through the connecting line, and into the launcher housing to inject the pig into the flowline as shown in block 32 of FIG. 3. The pig may be received by a host facility in fluid communication with the flowline.

In a preferred embodiment, opening the flow control device is performed hydraulically using a diver or a remotely operated vehicle. In a preferred embodiment where the flow control device is a hydraulic flow control valve, opening the flow control device comprises inserting a hot stab hydraulic fluid injector into a manifold comprising the hydraulic flow control valve, and hydraulically opening the hydraulic flow control valve.

Figure 4:
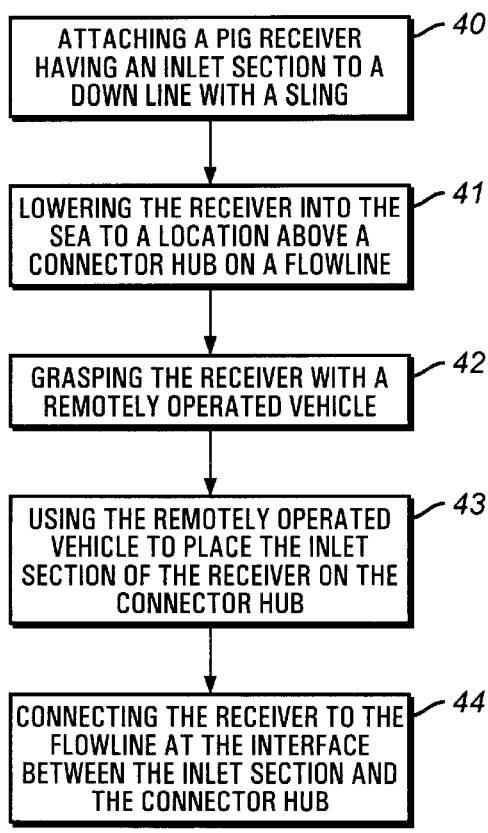
FIG. 4 is a block diagram of a method of assembling a subsea pig receiver in a flowline in the present invention.

Another aspect of the present invention is directed to a method of assembling a subsea pig receiver in a flowline, comprising attaching a pig receiver having an inlet section to a downline with a sling and lowering the receiver into the sea to a location above a connector hub on a flowline, as shown in block 40 of FIG. 4. This method further comprises lowering the receiver into the sea to a location above a connector hub on a flowline, as shown in block 41 of FIG. 4. This method further comprises grasping the receiver with a remotely operated vehicle as shown in block 42 of FIG. 4.

This method further comprises using the remotely operated vehicle to place the inlet section of the receiver on the connector hub as shown in block 44 of FIG. 4. This method further comprises connecting the receiver to the flowline at the interface between the inlet section and the connector hub as shown in block 46 of FIG. 4. In a preferred embodiment, the connecting is accomplished hydraulically.

Another aspect of the present invention is directed toward a method of collecting a sample from a subsea flowline. This method comprises establishing a pressure in a sample collecting vessel that is lower than a pressure in a subsea pressurized flowline to which the vessel is connected as shown in block 50 of FIG. 5. The same vessel which functions as the accumulator in the pig launching and receiving system of the present invention can function as the collecting vessel in this method merely by reducing the pressure in the vessel as shown in block 50 of FIG. 5. In some applications, it will be desirable to use a collecting vessel with a volume that is substantially less than the volume of an accumulator used in conjunction with the pig launching and receiving system of the present invention.

This method further comprises opening a flow control device in a connecting line installed between an outlet of the sample collecting vessel in the inlet of a pig launcher housing in fluid communication with the pressurized flowline, wherein the flowline contains processed fluid. In a preferred embodiment, the opening is performed hydraulically by a remotely operated vehicle. In another embodiment, the opening may be performed by a diver. The flow control device is opened for a sufficient amount of time to allow processed fluid to flow from the flowline, through the launcher, and into the vessel as shown in block 52 of FIG. 5.

Figure 5:
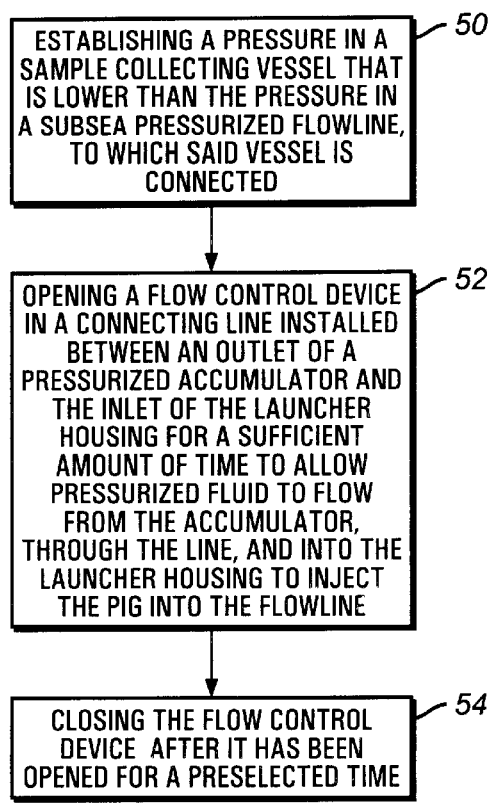
FIG. 5 is a block diagram of a method of collecting a sample from a subsea flowline of the present invention.

In a preferred embodiment, this method further comprises closing the flow control device after it has been opened for a preselected time, as shown in block 54 of FIG. 5.

The foregoing disclosure and description of the invention are illustrative and explanatory. Various changes in the size, shape, and materials, as well as in the details of the illustrative embodiments may be made without departing from the spirit of the invention.

What is claimed is:

1. A pig receiving system comprising:
   a. a flowline comprising a connector hub mounted on said flowline;
   b. a pig receiver mounted to said connector hub, said receiver comprising an outer body defining an inner volume sufficiently large to contain a pig sized to abrasively clean said flowline and further comprising an inlet section adjacent to said inner volume, said outer body comprising openings large enough to allow debris to pass through them and small enough to prevent a pig from passing through them;
   c. a pig retention mechanism mounted in said receiver and positioned such that it extends underneath a pig loaded in said receiver in order to retain a pig in said receiver; and
   d. a pig launcher connected to said flowline.

2. The system of claim 1, wherein said receiver is vertically mounted.

3. The system of claim 1, wherein said receiver comprises a check valve mounted in said inlet section.

4. The system of claim 1, wherein said pig retention mechanism comprises at least two spring loaded latches mounted on opposite sides of said inlet section, said latches being configured to project radially into the inlet section after the pig travels past them, such that they prevent the pig from dropping back into the flowline.

5. The system of claim 1, wherein said receiver comprises a removable top section large enough to permit the extraction of a pig from said receiver when said top section is removed.

6. The system of claim 1, further comprising a pig in said pig receiver.

7. A method of injecting a pig into a flowline comprising:
   a. placing a pig in a pig launcher housing connected to a flowline, said housing having an inlet and an outlet;
   b. opening a flow control device in a connecting line installed between an outlet of a pressurized accumulator and the inlet of said launcher housing for a sufficient amount of time to allow pressurized fluid to flow from said accumulator, through said line, and into said launcher housing to inject the pig into the flow;
   c. redirecting the direction of travel of the pig out of the flowline and into a pig receiver connected to the flowline at a point downstream from where the launcher housing is connected to the flowline; and d. retaining the pig in the receiver, wherein said retaining is performed by extending at least two spring loaded latches radially into the receiver below the pig to prevent the pig from passing back into the flowline.

8. The method of claim 7 wherein said opening a flow control device is performed hydraulically by a remotely operated vehicle.

9. A method of collecting a sample from a subsea pressurized flowline comprising:

a. establishing a pressure in a sample collecting vessel that is lower than the pressure in a subsea pressurized flowline, to which said vessel is connected; and b. opening a flow control device in a connecting line installed between said sample collecting vessel and a pig launcher housing, mounted in fluid communication with a pressurized flowline containing process fluid for a sufficient amount of time to allow process fluid to flow from said flowline, through said launcher, and then into said vessel.

10. The method of claim 9 wherein said opening is performed hydraulically by a remotely operated vehicle.

11. The method of claim 9 further comprising closing the flow control device after it has been opened for a preselected time.

\* \* \* \* \*

UNITED STATES PATENT AND TRADEMARK OFFICE
CERTIFICATE OF CORRECTION

PATENT NO.     : 6,454,492 B1
DATED          : September 24, 2002
INVENTOR(S)    : Dean et al.

It is certified that error appears in the above-identified patent and that said Letters Patent is hereby corrected as shown below:

Column 4,
Line 65, delete "flow" and insert -- flowpath --.

Signed and Sealed this

Fourth Day of February, 2003

JAMES E. ROGAN
*Director of the United States Patent and Trademark Office*